(12) United States Patent
Sakurai et al.

(10) Patent No.: US 9,966,190 B2
(45) Date of Patent: *May 8, 2018

(54) DIELECTRIC CERAMIC COMPOSITION AND MULTILAYER CERAMIC CAPACITOR

(71) Applicant: TDK CORPORATION, Tokyo (JP)

(72) Inventors: Dan Sakurai, Tokyo (JP); Nobuto Morigasaki, Tokyo (JP); Tatsuya Ishii, Tokyo (JP); Takuma Ariizumi, Tokyo (JP); Shinsuke Hashimoto, Tokyo (JP); Yasuhiro Ito, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/466,316

(22) Filed: Mar. 22, 2017

(65) Prior Publication Data

US 2017/0287636 A1 Oct. 5, 2017

(30) Foreign Application Priority Data

Mar. 30, 2016 (JP) ................................. 2016-068757

(51) Int. Cl.
*H01G 4/12* (2006.01)
*C04B 35/49* (2006.01)
*C04B 35/468* (2006.01)
*H01G 4/248* (2006.01)
*H01G 4/30* (2006.01)

(52) U.S. Cl.
CPC ........... *H01G 4/1245* (2013.01); *C04B 35/49* (2013.01); *H01G 4/248* (2013.01); *H01G 4/30* (2013.01); *C04B 2235/3208* (2013.01); *C04B 2235/3213* (2013.01); *C04B 2235/3215* (2013.01); *C04B 2235/3236* (2013.01); *C04B 2235/3249* (2013.01); *C04B 2235/768* (2013.01)

(58) Field of Classification Search
CPC .............................. C04B 35/49; H01G 4/1245
See application file for complete search history.

(56) References Cited

U.S. PATENT DOCUMENTS 7,397,649 B2 * 7/2008 Muto ................... C04B 35/4682
361/321.4

FOREIGN PATENT DOCUMENTS

JP 2004189588 A * 7/2004
JP 2011-256091 A 12/2011

* cited by examiner

*Primary Examiner* — Karl E Group
(74) *Attorney, Agent, or Firm* — Oliff PLC

(57) ABSTRACT

A dielectric ceramic composition has good characteristics even under the high electric field intensity, and particularly good IR characteristic and the high temperature accelerated lifetime. The dielectric ceramic composition has a main component having a perovskite type compound shown by a compositional formula $(Ba_{1-x-y}Sr_xCa_y)_m(Ti_{1-z}Zr_z)O_3$, a first sub component having oxides of a rare earth element R, a second sub component as a sintering agent, wherein the dielectric particles has dielectric particles having high diffusion rate of the rare earth element, preferably of a complete solid solution particle, and when a concentration of Ti atom in the diffusion phase is 100 atom %, then an average concentration of the rare earth element R in the diffusion phase is 5 atom % or more, and an average concentration of Zr in the diffusion phase is 10 atom % or more.

10 Claims, 6 Drawing Sheets

DIELECTRIC CERAMIC COMPOSITION AND MULTILAYER CERAMIC CAPACITOR

BACKGROUND OF THE INVENTION

1. Field of the Invention

The present invention relates to a dielectric ceramic composition, a multilayer ceramic capacitor including a dielectric layer comprising the dielectric ceramic composition, and particularly the present invention relates to the dielectric ceramic composition having good IR characteristic and a high temperature accelerated lifetime.

2. Description of the Related Art

Recently, as the electronic circuit has become highly densified, the electronic component is demanded to be more compact, and the multilayer ceramic capacitor has rapidly become more compact with larger capacity, further the purpose of use has become wider, thus various characteristics are in demand.

For example, the mid-high voltage capacitor which is used at a high rated voltage (for example 100 V or higher) is suitably used for ECM (engine electric computer module), a fuel injection device, an electric controlled throttle, an inverter, a convertor, HID headlamp unit, a battery control unit for a hybrid engine, a digital steel camera or so.

In case of using it at a high rated voltage as mentioned in the above, it is used under high electric field intensity, but if the electric field intensity becomes higher, the specific permittivity and the insulation resistance or so decreases, hence as a result, the effective capacity or the reliability under the used environment may decrease.

For example, the patent document 1 discloses the multilayer ceramic capacitor comprising a dielectric layer comprising the dielectric particle having a core-shell structure. This dielectric particle comprises a concentration gradient of a sub component at a shell part, and the maximum value of the sub component concentration is found at near the particle boundary and near the boundary between the shell part and the core part. The multilayer ceramic capacitor using this dielectric particle has good a capacity-temperature characteristic and lifetime characteristic.

However, the multilayer ceramic capacitor described in the patent document 1 exhibited insufficient characteristic under a high electric field intensity such as when applying DC voltage or so, and thus further improvement of the characteristics were demanded.

PRIOR ART DOCUMENT

Patent document 1: JP Patent Application Laid Open No. 2011-256091

SUMMARY OF THE INVENTION

The present invention is attained in view of such circumstances, and the object is to provide the dielectric ceramic composition having good characteristics even under the high electric field intensity, and particularly good IR characteristic and high temperature accelerated lifetime. Also, the object of the present invention is to provide the multilayer ceramic capacitor comprising the dielectric layer comprising said dielectric ceramic composition.

Means for Attaining the Object

In order to attain the above object, the dielectric ceramic composition according to the present invention comprises a main component comprising a perovskite type compound shown by a compositional formula $(Ba_{1-x-y}Sr_xCa_y)_m(Ti_{1-z}Zr_z)O_3$ (note that, said "m", "x", "y" and "z" all show a mol ratio, and each satisfies $0.94 \leq m \leq 1.1$, $0 \leq x \leq 1.0$, $0 \leq y \leq 1.0$, $0 \leq (x+y) \leq 1.0$, $0.1 \leq z \leq 0.3$), a first sub component comprising oxides of a rare earth element R (note that, R is at least one selected from the group consisting of Sc, Y, La, Ce, Pr, Nd, Pm, Sm, Eu, Gd, Tb, Dy, Ho, Er, Tm, Yb and Lu), a second sub component as a sintering agent, wherein said dielectric ceramic composition includes plurality of dielectric particles, said dielectric particles comprises a main component phase made of said main component, and a diffusion phase wherein said first sub component is diffused in said main component, a ratio of area occupied by said diffusion phase is 95% or more in average with respect to a total area of said main component phase and said diffusion phase in a cross section, and when a concentration of Ti atom in said diffusion phase is 100 atom %, then an average concentration of the rare earth element R in the diffusion phase is 5 atom % or more, and an average concentration of Zr in the diffusion phase is 10 atom % or more.

In the preferable embodiment, when the concentration of Ti atom in said diffusion phase is 100 atom %, the average concentration of the rare earth element R in the diffusion phase is preferably 8 atom % or more, and the average concentration of Zr in the diffusion phase is 20 atom % or more.

Also, in other preferable embodiment of the present invention, when the average concentration of the rare earth element R in said diffusion phase is Ra, and the average concentration of Zr in the diffusion phase is Za, then Ra/Za preferably satisfies $0.2 < (Ra/Za) < 0.45$.

As the electronic component according to the present invention, it is not particularly limited as long as it includes the above mentioned dielectric ceramic composition, and for example a multilayer ceramic capacitor, a piezoelectric element, a chip inductor, a chip varistor, a chip thermister, a chip resistor, and other surface mounting (SMD) chip type electronic component or so may be mentioned. The multilayer ceramic capacitor comprises the dielectric layer including the dielectric ceramic composition of the present invention, and the internal electrode layer.

Effect of the Present Invention

According to the present invention, by setting the content of each component within the above range, and by setting the area ratio between the main component phase and the diffusion phase and also the composition of the diffusion phase within the above mentioned range, the dielectric ceramic composition having particularly good IR characteristic and high temperature accelerated lifetime can be obtained. By setting the composition of the diffusion phase within the specific range, the basic characteristics such as the specific permittivity can be maintained good, and also the IR characteristic and the high temperature accelerated lifetime can be improved.

DESCRIPTION OF THE PREFERRED EMBODIMENTS

Hereinafter, the present invention will be described based on the embodiment as shown in the figure.

Multilayer Ceramic Capacitor 1

Figure 1:
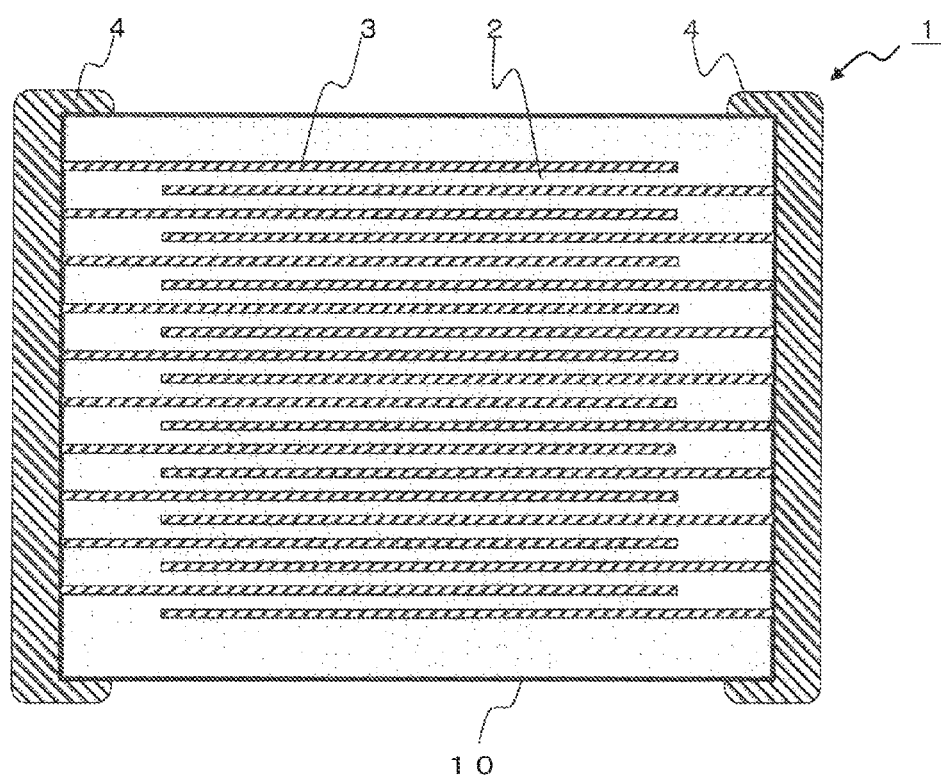
FIG. 1 is the cross section of the multilayer ceramic capacitor according to the first embodiment of the present invention.

As shown in FIG. 1, the multilayer ceramic capacitor 1 as one non-limiting example of the ceramic electronic component comprises the capacitor element main body 10 wherein the dielectric layer 2 and the internal electrode layer 3 are stacked in alternating manner. The internal electrode layer 3 is stacked so that each end faces thereof expose alternatingly to the surface of the two end parts opposing in the capacitor element main body 10. Pair of the external electrodes 4 are formed at the both end parts of the capacitor element main body 10, and are connected to the exposed end face of the internal electrode layer 3 placed alternatingly, thereby the capacitor circuit is formed.

The shape of the capacitor element body 10 is not particularly limited, however as shown in FIG. 1, usually it is rectangular parallelepiped shape. Also, the size thereof is not particularly limited, and the size may be determined appropriately depending on the purpose of use.

Dielectric Layer 2

The dielectric layer 2 is constituted from the dielectric ceramic composition according to the present embodiment. The dielectric ceramic composition includes barium titanate based composite oxide of perovskite type ($ABO_3$) as a main component, the first and second sub components which will be described in below, and also other sub components if needed.

The main component is a perovskite type compound which is expressed by a compositional formula of $(Ba_{1-x-y}Sr_xCa_y)_m(Ti_{1-z}Zr_z)O_3$. Here, "m", "x", "y" and "z" all show mol ratio.

In the compositional formula, "m" shows A/B ratio, and it is $0.94 \leq m \leq 1.1$, and preferably $0.95 \leq m < 0.99$. Also, in other preferable embodiment, "m" may be $0.94 \leq m \leq 0.95$, and also it may be $0.99 \leq m \leq 1.1$. If the value "m" of the main component is too small, IR characteristic becomes low due to the over sintering (abnormal crystal growth), and if the value "m" is too large, then the high temperature accelerated lifetime may decline.

In the compositional formula, "x" shows the ratio of Sr in A site, and it is $0 \leq x \leq 1.0$, preferably $0 \leq x \leq 0.2$, more preferably $0 \leq x \leq 0.1$, further preferably $0 \leq x \leq 0.02$, and it may be 0.

In the compositional formula, "y" shows the ratio of Ca in A site, and it is $0 \leq y \leq 1.0$, preferably $0 \leq y \leq 0.2$, more preferably $0 \leq y \leq 0.1$, further preferably $0 \leq y \leq 0.02$, and it may be 0.

Also, (x+y) is $0 \leq (x+y) \leq 1.0$, preferably $0 \leq (x+y) \leq 0.4$, more preferably $0 \leq (x+y) \leq 0.2$, further preferably $0 \leq (x+y) \leq 0.04$, and it may be 0.

In the compositional formula, "z" shows the ratio of Zr in B site, and it is preferably $0.1 \leq z \leq 0.3$, and preferably $0.15 \leq z \leq 0.28$. Also, in other preferable embodiment, "z" may be $0.1 \leq z \leq 0.15$, and it may be $0.28 \leq z \leq 0.3$. By substituting B site with Zr, the bandgap becomes higher, and the resistance can be increased. On the other hand, if Zr is too much, the rare earth element which is the first sub component is interfered from solid dissolving to the main component, and tends to decrease the high temperature accelerated lifetime.

The dielectric ceramic composition comprises the oxides of the rare earth element R as the first sub component. Here, the rare earth element is at least one selected from the group consisting of Sc, Y, La, Ce, Pr, Nd, Pm, Sm, Eu, Gd, Tb, Dy, Ho, Er, Tm, Yb and Lu. Preferably, it is at least one selected from the group consisting of Y, Eu, Gd, Tb and Ho. Note that, two or more of the oxides of the rare earth element can be used together.

The oxides of the rare earth element R is used in the ratio of 8 to 14 mol and preferably 10 to 13 mol with respect to 100 mol of said main component. Also, as other preferable embodiment, it may be 8 to 10 mol, and it may be 13 to 14 mol as well. Note that, the oxides of the rare earth element is usually shown as $R_2O_3$, but the ratio in terms of oxides in the present embodiment is shown as the mol number based on $RO_{3/2}$. Although it is not to be theoretically limited in any way, a part of the rare earth element R is substituted at A site, and act as the donor which releases electron. The released electron captures the oxygen defect, thus the movement of the oxygen defect during the high temperature accelerated lifetime test is suppressed, and it is thought to enhance the high temperature accelerated lifetime. If the content of the first sub component is too little, the movement of the oxygen defect cannot be suppressed, thus the high temperature accelerated lifetime may decrease. If the first sub component is too much, the IR characteristic may decrease.

The dielectric ceramic composition further includes the sintering agent as the second sub component. The sintering agent is not particularly limited as long as it contributes to the sintering of the above mentioned main component and the first sub component, however usually the oxides of Si, Li, Al, Ge and B are preferably used. The contents of the sintering agent in terms of $SiO_2$, $LiO_{1/2}$, $AlO_{3/2}$, $GeO_2$, or $BO_{3/2}$ are preferably 2.5 mol or more, more preferably 2.5 to 3.9 mol or more, and particularly preferably 3 mol to 3.7 mol, with respect to 100 mol of the main component. By having the content of the second sub component within this range, the insulation resistance and the high temperature accelerated lifetime tends to increase. If the content of the sintering agent is too much, the high temperature accelerated lifetime tends to deteriorate. On the other hand, if too little, the sintering property tends to decline.

As the second sub component, the oxides of Si are preferably used, because it has great effect to improve the characteristics among the above mentioned oxides. As the oxides including Si, it is not particularly limited, and it may be in a form of $SiO_2$ alone, or it may be in a form of composite oxides between Si and other elements such as alkali metal and alkaline earth metal. In the present embodiment, as the oxides including Si, $SiO_2$ is preferable.

The dielectric ceramic composition of the present invention may comprise other sub components besides the above mentioned. As the preferable sub components, oxides of Mg as the third sub component, oxides of element M selected from at least one of the group consisting of Mn, Cr, Co and Fe as the fourth sub component may be mentioned.

The third sub component is preferably used in the ratio of 0 to 15 mol, more preferably 4 to 8 mol, and further preferably 4.5 to 6 mol in terms of oxides (MgO) with respect to 100 mol of said main component. Also, in other preferable embodiment, it may be 4 to 4.5 mol, and 6 to 8 mol as well. By having the content of the third sub component within the above mentioned range, IR characteristic and the high temperature accelerated lifetime tend to improve in good balance.

The dielectric ceramic composition may include oxides of at least one element M selected from the group consisting of Mn, Cr, Co and Fe; and preferably it includes MnO, CrO, and particularly preferably it includes MnO as the fourth sub component. Note that, two or more of the oxides of Mn, Cr, Co and Fe may be used together. The ratio of the fourth sub component is 0 to 2.0 mol, and preferably 0.6 to 2.0 mol, more preferably 1.1 to 1.5 mol in terms of oxides (MO), with respect to 100 mol of said main component. Also, in the other preferable embodiment, it may be 0.6 to 1.0 mol. If the content of the fourth sub component is within the above mentioned range, IR characteristic tends to improve. Note that, the ratio of the fourth sub component in terms of oxides shows the mol number based on MnO, CrO, CoO and FeO.

Although it is not to be theoretically limited in any way, part of the metal elements included in the third and fourth sub components act as the acceptor which substitutes at B site and receives electron, and it is thought to contribute to the improvement of IR characteristic.

By setting the composition of the main component and the content of the sub components within the above mentioned range, the dielectric ceramic composition having particularly good IR characteristic and the high temperature accelerated lifetime can be easily obtained. Particularly, by setting the composition of the main component and the content of the sub components within the specific range, the basic characteristic such as the specific permittivity or so can be maintained good, and even more IR characteristic and the high temperature accelerated lifetime can be easily improved.

The dielectric ceramic composition according to the present embodiment may further comprise other components depending of the desired characteristic. The composition of the dielectric ceramic composition can be verified by Inductively Coupled Plasma (ICP) emission spectrometric analysis.

(Structure of the Dielectric Particle)

In the present embodiment, the dielectric ceramic composition constituting the above mentioned dielectric layer 2 includes plurality of dielectric particles. The shape and the particle diameter of the dielectric particle is not particularly limited. In the dielectric particles, when the phase made of said main component is defined as the main component phase, and the phase where the first sub component is diffused to the main component is defined as the diffusion phase, the area ratio occupied by the diffusion phase is in average 95% or more, preferably 97% or more, more preferably 98% or more, particularly preferably 99% or more, and most preferably 100% with respect to the total area of said main component phase and said diffusion phase in a cross section. Therefore, preferably, the dielectric particle is particularly preferably constituted entirely by the diffusion phase which is also called as the complete solid solution particle.

The dielectric particle is the particle wherein the rare earth element R of the first sub component is solid dissolved (diffused) in the main component phase. Note that, other sub component elements besides the rare earth element R may be solid dissolved.

Figure 2:
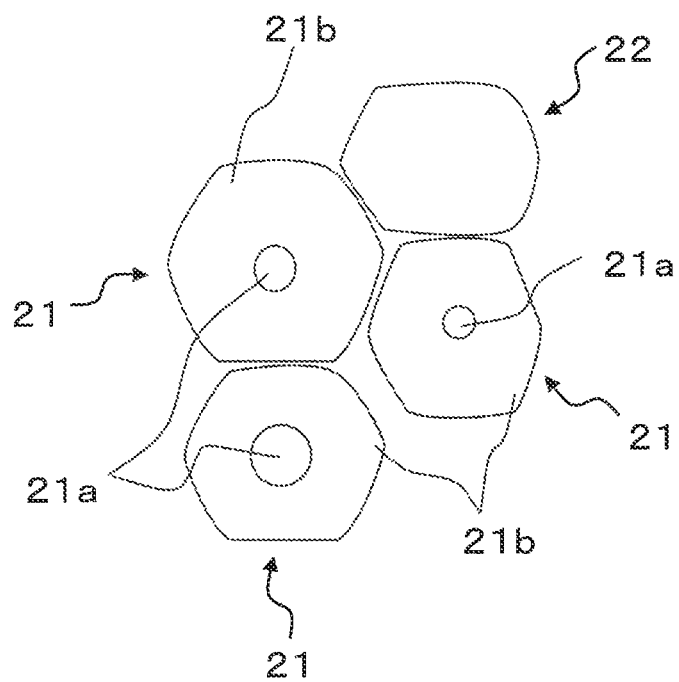
FIG. 2 is the enlarged cross section of the essential part of the dielectric layer 2 shown in FIG. 1.

As shown in FIG. 2 schematically, at the cross section of the dielectric particle, the phase substantially consisted only from the main component (the main component phase) can be verified as the core 21a at the center part of the particle. The phase where the rare earth element R is solid dissolved (diffused) to the main component (the diffusion phase) can be verified as the shell 21b around the core. In other words, when the main component phase exists, the diffusion phase including the main component and the rare earth element R is formed at the surrounding area of the main component phase. That is, the dielectric layer is the crystal particle (the core-shell structure particle 21) comprising the core-shell structure which is constituted from the core 21a substantially made of the main component, and the shell 21b present around the core 21a and the rare earth element R diffused to the main component. The core 21a is substantially formed only from the main component, and the shell 21b is formed from the solid dissolved phase wherein the rare earth element R is diffused to the main component. When the diffusion of the rare earth element R into the main component proceeds, the core phase (the main component phase) made of the main component disappears, and will form the dielectric particle entirely formed only from the diffusion phase (shell).

The dielectric particle preferably has large area of the shell part, and rarely comprises the core part; and it is particularly preferably the complete solid solution particle which does not have the main component and formed of the diffusion phase. Hereinafter, for the sake of the convenience, the dielectric particle having 95% or more of the area ratio occupied by the diffusion phase may be referred as "the highly solid dissolved particle". In the dielectric layer 2, not all of the dielectric particles do not necessarily have to be the highly solid dissolved particle, and the particle having less than 95% of the area ratio occupied by the diffusion phase may be included.

By constituting the dielectric layer 2 mainly by the highly solid dissolved particle, the multilayer ceramic capacitor having excellent lifetime characteristic of insulation resistance or so can be obtained even under the high electric field intensity.

By changing the added amount of the first sub component, and the condition of the calcination and the sintering or so, the ratio of the diffusion phase in the dielectric particle, and the ratio of the highly solid dissolved particle with respect to the entire dielectric particles can be controlled.

The area ratio of the diffusion phase in the dielectric particle can be calculated by processing the microscopic image of the cross section of the dielectric layer using the image processing software or so. First, the capacitor element main body 10 is cut at the perpendicular face in the stacking direction of the dielectric layer 2 and the internal electrode layer 3. The chemical etching of the dielectric layer cross section is carried out, then for the arbitrarily selected 200 or more of the dielectric particles, the area of the dielectric particles are calculated. The circle equivalent diameter of this particle is calculated from this area, then the dielectric particle diameter $L_1$ is obtained. Also, an ion milling is carried out, and from the backscattered electron image of the electronic microscope, the core particle diameter $L_2$ is obtained in a similar manner for the area where the rare earth element R is not present (the core). Note that, for the particles of which the core part was not observed, the core particle diameter is considered zero (0). Further, from the obtained dielectric particle diameter $L_1$ and the core particle diameter $L_2$, the area ratio (the shell ratio) of the diffusion phase (shell) occupying the area of the dielectric particle is calculated from the below equation.

Shell ratio (%)=$100\times(1-(L_2^2/L_1^2))$

Then, the dielectric particle having 95% or more of the shell ratio (the area ratio of the diffusion phase) is defined as the highly solid dissolved particle 22, and the dielectric particle having less than 95% of the shell ratio is defined as the core-shell structure particle 21. In the present embodiment, the dielectric layer 2 includes the dielectric particle of highly solid dissolved type wherein the shell ratio is 95% or more.

In the present embodiment, for the dielectric layer 2, the ratio of the particle having 95% or more of the area ratio occupied by the diffusion phase (the highly solid dissolved particle) and the particle having less than 95% of the area ratio occupied by the diffusion particle, is preferably 90% or more, and more preferably of 95% or more of the highly solid dissolved particle when the total number of the entire dielectric particle is 100%; and preferably the dielectric layer 2 substantially consists of the particle having 95% or more of area ratio occupied by the diffusion phase (the highly solid dissolved particle).

Also, when the average of the dielectric particle diameter $L_1$ which is calculated from the 200 or more of the dielectric particles constituting the dielectric layer is defined as the average dielectric particle diameter $L_{1ave}$, and the average of the core particle diameter $L_2$ is the average core particle diameter $L_{2ave}$, then the average shell ratio of the dielectric layer is calculated from the below equation.

The average shell ratio (%)=$100\times(1-(L_{2ave}^2/L_{1ave}^2))$

In the dielectric layer of the present embodiment, the average shell ratio is 95% or more, preferably 97% or more, more preferably 98% or more, particularly preferably 99% or more, and most preferably 100%. Therefore, the dielectric particle constituting the dielectric layer 2 is particularly preferably constituted entirely by the diffusion phase, which is also called as the complete solid solution particle.

In the present embodiment, the average particle diameter $L_{1ave}$ of the dielectric particle (equivalent circle diameter) is preferably 0.2 to 3.0 and more preferably 0.5 to 1.0 μm.

Also, when the concentration of the Ti atom in the diffusion phase is 100 atom %, the average concentration Ra of the rare earth element R in the diffusion phase is 5 atom % or more, preferably 8 atom % or more, more preferably 8 to 12 atom %, and particularly preferably 8 to 11 atom %. Also, in other embodiment, the average concentration Ra of the rare earth element R in the diffusion phase may be 5 to 8 atom %.

Further, when the concentration of the Ti atom in the diffusion phase is 100 atom %, the average concentration Za of Zr in the diffusion phase is 10 atom % or more, more preferably 20 atom % or more, further preferably 20 to 30 atom %, and particularly preferably 22 to 28 atom %. Further, in other embodiment, the average concentration Za of Zr in the diffusion phase may be 10 to 20 atom %, and 28 to 30 atom %.

Also, for other preferable embodiment of the present invention, when the average concentration of the rare earth element R in the diffusion phase is defined as Ra, and the average concentration of Zr in the diffusion phase is defined as Za, Ra/Za preferably satisfies 0.2<(Ra/Za)<0.75, and more preferably 0.2<(Ra/Za)<0.45. Also, in other embodiment, Ra/Za may be 0.45≤(Ra/Za)<0.75.

As discussed in above, a part of the rare earth element R substitutes at A site and releases electrons, which means that it acts as the donor. In the diffusion phase, the solid dissolving of the rare earth element R is promoted, and the substitution rate of A site by the rare earth element R is increased, thus by increasing the ratio of the above mentioned diffusion phase, the high temperature accelerated lifetime is thought to be improved. Also, by substituting B site with Zr, the bandgap is increased, thus the resistance can be increased. By setting the average concentration Ra of the rare earth element, the average concentration Za of Zr and the ratio Ra/Za, in the diffusion phase within the above mentioned range, the IR characteristic and the high temperature accelerated lifetime can be improved in good balance.

The measurement of the concentration ratio Ra/Za between the concentration Ra of the rare earth element and the concentration Za of Zr can be verified for example from the mapping image showing the distribution of Ti, the rare earth element R and Zr in the diffusion phase of the dielectric particle.

Specifically, in the cross section of the dielectric layer 2, using the energy ray dispersive X ray spectrometer (EDS) attached to the transmission electron microscope (TEM), the area analysis of Ti, the rare earth element R and Zr in the diffusion phase is carried out. This area analysis is preferably carried out to 150 or more dielectric particles. In the present embodiment, the area (visual field) where 30 or so of the dielectric particles are present is measured for 5 or more visual fields. Then, the characteristic X ray obtained from the analysis is analyzed, thereby the mapping images of the distribution of Ti, the rare earth element R and Zr are obtained. For each analysis point, the concentration of the rare earth element R and Zr when the concentration of Ti atom is 100 atom % are calculated, thereby the average concentration of Ra and Za are obtained, and the concentration ratio Ra/Za is calculated.

The thickness of the dielectric layer is not particularly limited, but it is preferably 0.5 to 20 μm or so per one layer.

The stacked number of the dielectric layer 2 is not particularly limited, but preferably it is 20 or more, more preferably 50 or more, and particularly preferably 100 or more. The upper limit of the stacking number is not particularly limited, and for example it is 2000 or so.

Internal Electrode Layer 3

The conductive material comprised in the internal electrode layer 3 is not particularly limited, however because the material constituting the dielectric layer 2 is reduction resistant, a relatively inexpensive base metal can be used. As the base metal used as the conductive material, Ni or Ni alloy is preferable. As Ni alloy, the alloy between Ni and an element selected from the group consisting of Mn, Cr, Co and Al is preferable, and preferably the content of Ni in the alloy is 95 wt % or more. Note that, in Ni or Ni alloy, various trace components such P or so may be included by 0.1 wt % or less. The thickness of the internal electrode layer 3 may be determined accordingly based on the purpose of use, however preferably it is 0.1 to 3 μm or so.

External Electrode 4

The conductive material comprised in the external electrode 4 is not particularly limited, but inexpensive Ni, Cu and the alloy thereof can be used in the present embodiment. The thickness of the external electrode 4 can be determined appropriately depending on the purpose of use, but usually it is preferably 10 to 50 μm or so.

Production Method of the Multilayer Ceramic Capacitor 1

The multilayer ceramic capacitor 1 of the present embodiment is produced as similar to the conventional multilayer ceramic capacitor, that is the green chip is produced by a printing method or sheet method or so using the paste, then firing this, followed by printing or transferring the external electrode and firing, thereby the multilayer ceramic capacitor 1 of the present embodiment is produced. Hereinafter, the non-limiting example of the production method will be explained.

First, the dielectric material for forming the dielectric layer is prepared, then this is made into paste, thereby the dielectric layer paste is prepared.

(Materials)

As the dielectric material, the material of the main component, and the material of each sub components are prepared. As the materials thereof, the oxides of the above mentioned component and the mixture thereof, the composite oxides can be used. Also, it can be selected from various compounds which forms the above mentioned oxides and composite oxides by firing, such as carbonate, oxalate, nitrate, hydroxides, organometal compound or so, and also it can be used by mixing these.

As the material of the main component, those made by various methods such as so called solid phase method and various liquid phase methods (for example, an oxalate method, a hydrothermal synthesis method, an alkoxide method and a sol gel method or so) can be used.

Further, in case components other than the above mentioned main component and the sub components are included in the dielectric layer, as the material of such components, as similar to the above, the oxides of these, the mixture and the composite oxide thereof can be used. Also, in addition, various compounds which become the above mentioned oxides and the composite oxides by firing can be used as well. The content of each components in the dielectric material may be determined so that it satisfies the composition of the above mentioned dielectric ceramic composition after firing.

(Preparation of the Dielectric Material)

In order to prepare the dielectric material, the material of each component is thoroughly mixed to obtain the mixture powder, then this is heat treated (calcined), and the calcined material is obtained. The mixing of the material is not particularly limited, but it is thoroughly mixed for 20 hours or so by a wet method, then it is dried.

The calcining condition is not particularly limited, however the calcining temperature is 900 to 1350° C., preferably 1000 to 1350° C., the temperature holding time is preferably 1 to 10 hours, the temperature increasing rate up to the calcining temperature is 10° C./hour to 2000° C./hour or so, the temperature decreasing rate after holding time at the calcining temperature is 200° C./hour or more, preferably 300° C./hour or more, and more preferably 400° C./hour or more.

Also, only the main component material may be carried out with preliminary calcine at relatively low temperature (for example, 950° C. to 1050° C.), then the sub component is added and mixed to further calcine at high temperature, thereby the dielectric material can be obtained as well. The holding time or so in this case is same as the mentioned in the above.

For obtaining the dielectric particle having high ratio of the diffusion phase, preferably the main component material, the sub component materials are mixed at once and calcined as mentioned in above. Also, the holding time is relatively longer, and for example 4 hours or more, and the holding temperature is high, for example 1100° C. or higher, thereby the diffusion of the rare earth element R is promoted, and the dielectric particle having high ratio of the diffusion phase can be obtained easily.

Also, by increasing the temperature at slow temperature increasing rate (for example, 10° C./hour or less, preferably 5° C./hour or less, more preferably 2° C./hour or less) in between 100° C. to 200° C. at right before reaching the holding temperature, the diffusion of the rare earth element R and Zr can be promoted. For example, when the holding temperature is 1100° C., the temperature is increased at relatively fast temperature increasing rate (for example, 200° C./hour) in between the room temperature to 1000° C., then increasing the temperature at the temperature increasing rate 10° C./hour or less, preferably 5° C./hour or less, and more preferably 2° C./hour or less in between 1000° C. to 1100° C.; thereby the dielectric particle having high rare earth element concentration and Zr concentration in the diffusion phase can easily obtained. Although it is not to be limited theoretically in anyway, by slowing the temperature increasing rate before reaching at the holding temperature, the rare earth element and Zr tends to easily incorporated into the main component which is being formed, thus it is thought that the dielectric particle having high rare earth element concentration and Zr concentration can be obtained.

If needed, the calcined material obtained as such (the material after the reaction) is pulverized. Then, if needed, the calcined material, the additional main component material, and sub component material are mixed, thereby the dielectric material can be obtained. Note that, part of the components evaporates during the calcination, and the composition may change, thus the addition of the components to the calcined material may be determined so to form the desired composition after the firing.

(Preparation of the Green Chip)

Next, the dielectric material is made into a paste, then the dielectric paste is prepared. The dielectric layer paste may be an organic paste kneaded with dielectric material and the organic vehicle, or it may be a water-based paste.

The organic vehicle is obtained by dissolving a binder in an organic solvent. The binder used in the organic vehicle is not particularly limited, and may be properly selected from a variety of usual binders such as ethylcellulose and polyvinyl butyral or so. Also, the organic solvent used is not particularly limited, and may be properly selected from a variety of organic solvents such as terpineol, butyl carbitol, acetone and toluene or so in accordance with a method used such as a printing method and a sheet method or so.

Also, when using water-based dielectric layer paste, dielectric materials can be kneaded with a water-based vehicle obtained by dissolving an aqueous binder and a dispersant or so in water. The aqueous binder used for water-based vehicle is not particularly limited, and for example, polyvinyl alcohol, cellulose, aqueous acrylic resin or so may be used.

An internal electrode layer paste is obtained by kneading conductive materials consisting of the above mentioned various conductive metals and alloys, or various oxides, organic metallic compound and resinate or so, which become the above mentioned conductive materials after firing, with the above mentioned organic vehicle. Also, an inhibitor may be included in the internal electrode layer paste. As the inhibitor, it is not particularly limited, but preferably the inhibitor comprises the same composition as the main component.

An external electrode paste may be obtained as same as the above mentioned internal electrode layer paste.

The content of organic vehicle in each of the above mentioned paste is not particularly limited, and may be an usual content, for example, 1 to 5 wt % or so of the binder and 10 to 50 wt % or so of the solvent. Also, in each paste, the additives may be included which are selected from variety of dispersants, plasticizers, dielectrics, insulators or so, if needed. The total contents of these are preferably 10 wt % or less.

When using the printing method, the dielectric layer paste and the internal electrode layer paste are printed on a substrate such as PET or so to form layers, and after cutting to a predetermined shape, the green chip is obtained by removing from the substrate.

Also, when using the sheet method, a green sheet is formed by using the dielectric layer paste, and the internal electrode layer paste is printed thereon, then these are stacked to form the green chip.

(Binder Removal, Firing, and Annealing)

Before firing, the green chip is subjected to a binder removal treatment. The binder removal conditions are, the temperature increasing rate of preferably 5 to 300° C./hour, the holding temperature of preferably 180 to 900° C., and the temperature holding time of preferably 0.5 to 24 hours. Also, the binder removal atmosphere is the air or reduced atmosphere.

After the binder removal, the firing of the green chip is carried out. The atmosphere when firing the green chip can be suitably determined depending on the type of the conductive material in the internal electrode paste. However when using base metal such as Ni or Ni alloy as the conductive material, the oxygen partial pressure of the firing atmosphere is preferably $10^{-14}$ to $10^{-10}$ MPa. If the oxygen partial pressure is below said range, the conductive material of the internal electrode layer may have abnormal sintering which results in a breakage thereof. Also, if the oxygen partial pressure exceeds said range, the internal electrode layer tends to oxidize.

The holding temperature at the firing is preferably 1000 to 1400° C., and more preferably 1100 to 1360° C. If the holding temperature is below said range, the densification becomes insufficient; and if it exceeds said range, the breakage of the electrode tend to occur due to the abnormal sinter of the internal electrode layer, the deterioration of the capacitance-temperature characteristics tend to occur due to the dispersion of the constitution material of the internal electrode layer, or a reduction of the dielectric ceramic composition tend to occur.

As for the other firing conditions, the temperature rising rate is preferably 50 to 2000° C./hour, and more preferably 200 to 300° C./hour; the temperature holding time is preferably 0.5 to 8 hours, and more preferably 1 to 3 hours; and the cooling rate is preferably 50 to 2000° C./hour, and more preferably 200 to 300° C./hour. Also, the firing atmosphere is preferably a reduced atmosphere. As for the atmospheric gas, for example, wet mixed gas of $N_2$ and $H_2$ may be used.

After firing in a reducing atmosphere, it is preferable to anneal the capacitor element body. The annealing is a treatment for reoxidizing the dielectric layer and can make the lifetime significantly longer, thereby the reliability is improved.

The oxygen partial pressure in the annealing atmosphere is preferably $10^{-9}$ to $10^{-5}$ MPa. When the oxygen partial pressure is below the above range, it may be difficult to reoxidize the dielectric layer. When it exceeds the above range, the internal electrode layer tends to be further oxidized.

The holding temperature at annealing is preferably 1100° C. or less, particularly preferably 500 to 1100° C. When the holding temperature is below the above range, the dielectric layer may not be sufficiently oxidized, which tends to result in low insulation resistance and short high temperature accelerated lifetime. On the other hand, when the holding temperature exceeds the above range, not only the internal electrode layer is oxidized to reduce the capacitance, but also the internal electrode layer reacts with the dielectric element itself, which may tend to cause deteriorated capacitance-temperature characteristics, lowered insulation resistance, and lowered high temperature accelerated lifetime. Note that the annealing may consist of a temperature rising step and temperature decreasing step. That is, the temperature holding time may be zero. In this case, the holding temperature is as same as the maximum temperature.

Additional annealing conditions include: the temperature holding time of preferably 0 to 20 hours, more preferably 2 to 10 hours; and the cooling rate of preferably 50 to 500° C./hour, more preferably 100 to 300° C./hour. Also, the atmosphere gas at annealing is preferably $N_2$ or $N_2+H_2O$ gas or so, for example.

Also, the binder removal treatment, the firing and the annealing may be performed continuously or independently.

Thus obtained capacitor element body is then carried out with an end surface polishing, for example, by a barrel polishing or a sand blasting, and the external electrode paste is pasted thereon, followed by firing, so that the external electrode 4 is formed. If needed, a covering layer may be formed on the surface of the external electrode 4 by plating or so.

Thus produced multilayer ceramic capacitor of the present embodiment is mounted on the printed-circuit board or so by soldering or so, to be used in a variety of electronic devices or so.

Hereinabove, an embodiment of the present invention is described, but the present invention is not to be limited to the above-mentioned embodiments and can be variously modified within the scope of the present invention.

For example, in the above-mentioned embodiment, a multilayer ceramic capacitor is exemplified as an electronic component according to the present invention. However, the electronic component according to the present invention is not limited to the multilayer ceramic capacitor and may be any comprising the dielectric layer having the above composition.

As discussed in above, the electronic component according to the present invention has excellent IR characteristic and the high temperature accelerated lifetime, thus it is particularly suited as the multilayer ceramic capacitor for the mid-high voltage having high rated voltage (for example 100 V or higher).

EXAMPLE

Hereinafter, the present invention will be described based on the further detailed examples, but the present invention is not limited to the examples.

(Preparation 1 of the Dielectric Materials) Samples 1 to 26

As the main component material, barium carbonate ($BaCO_3$), calcium carbonate ($CaCO_3$), strontium carbonate ($SrCO_3$), titanium oxide ($TiO_2$) and zirconium oxide ($ZrO_2$) were prepared. Further, the rare earth oxides as the first sub component material, and oxides of Si and Al as the second sub component material, and magnesium oxide (MgO) as the third sub component and oxides of Mn and Cr as the material of the fourth sub component were prepared.

Said main component and sub components were weighed so that the composition after the firing satisfies the composition shown in Table 1. After weighing each material, each material were mixed. The mixing was carried out for 20 hours by a ball mill using wet mix stirring. The compound obtained after the wet mix stirring was dehydrated and dried. After being dehydrated and dried, the temperature was raised to room temperature to 1000° C. at the temperature increasing rate of 200° C./hour, and the temperature was increased at 10° C./hour from 1000° C. to 1100° C., to calcine for 4 hours at 1100° C., then pulverized if necessary, thereby the powder of the calcined materials (the dielectric materials) was obtained.

(Preparation 2 of the Dielectric Materials) Samples 27 to 30

As the main component material, barium carbonate ($BaCO_3$), calcium carbonate ($CaCO_3$), strontium carbonate ($SrCO_3$), titanium oxide ($TiO_2$) and zirconium oxide ($ZrO_2$) were prepared. Said main component was weighed so that the main component composition after the firing satisfies the composition shown in Table 1. Each material was mixed after weighed. The mixing was carried out for 20 hours by a ball mill using wet mix stirring. The compound obtained after the wet mix stirring was dehydrated and dried. After being dehydrated and dried, it was calcined at 1000° C. for 1 hour, then pulverized if necessary, thereby the calcined powder of the main component was obtained.

Further, the rare earth oxides as the first sub component material, and oxides of Si and Al as the second sub component material, and magnesium oxide (MgO) as the third sub component and oxides of Mn and Cr as the material of the fourth sub component were prepared. Said main component and sub components were weighed so that the composition after the firing satisfies the composition shown in Table 1. After weighing each material, these were mixed. The mixing was carried out for 20 hours by a ball mill using wet mix stirring. The compound obtained after the wet mix stirring was dehydrated and dried. After being dehydrated and dried, the temperature was raised from room temperature to 1000° C. at the temperature increasing rate of 200° C./hour, and the temperature was increased at 10° C./hour from 1000° C. to 1100° C., to calcine for 4 hours at 1100° C., then pulverized if necessary, thereby the powder of the calcined materials (the dielectric materials) was obtained.

(Preparation 3 of the Dielectric Materials) Samples 31 to 34

The calcined material (the dielectric material) powder was obtained as same as sample 15 except that during the calcination, the temperature increasing rate from 1000° C. to 1100° C. was 2° C./hour (sample 31), 5° C./hour (sample 33), 200° C./hour (sample 34).

(Preparation of the Dielectric Layer Paste)

Next, the obtained dielectric material: 100 parts by weight, polyvinyl butyral resin: 10 parts by weight, dioctyl phthalate (DOP) as a plasticizer: 5 parts by weight, and alcohol as a solvent: 100 parts by weight were mixed by a ball mill to form a paste, thereby a dielectric layer paste was obtained.

(Preparation of the Internal Electrode Layer Paste)

Also, aside from the above, Ni particles: 44.6 parts by weight, terpineol: 52 parts by weight, ethyl cellulose: 3 parts by weight and benzotriazole: 0.4 parts by weight were kneaded by triple rolls, thereby an internal electrode layer paste was obtained.

(Preparation of the Green Chip)

Then, by using the above obtained dielectric layer paste, on a PET film, a green sheet was formed so that the thickness after drying was 15 μm. Next, by using the internal electrode layer paste, an electrode layer was printed in a predetermined pattern thereon, followed by removing the sheet from the PET film, thereby the green sheet with the electrode layer was obtained. A plurality of green sheets with the electrode layer were stacked and adhered by pressure to obtain a green multilayer body. The green multilayer body was cut into a predetermined size to obtain a green chip.

(Preparation of the Multilayer Ceramic Capacitor)

Then, the obtained green chip was subjected to the binder removal treatment, the firing and the annealing in the following conditions, to obtain a multilayer ceramic sintered body.

The binder removal treatment was performed under the condition of the temperature increasing rate: 25° C./hour, the holding temperature: 260° C., the temperature holding time: 8 hours, and the atmosphere: in the air.

The firing condition was performed at the temperature rising rate: 200° C./hour, the holding temperature: 1200 to 1300° C., the temperature holding time of 2 hours, the temperature decreasing rate was 200° C./hour. Note that, the atmosphere gas was wet mixed gas of $N_2+H_2$, and the oxygen partial pressure was $10^{-13}$ MPa.

The annealing was performed at the temperature increasing rate: 200° C./hour, the holding temperature: 1050° C., the temperature holding time: 2 hours, the temperature decreasing rate: 200° C./hour, and the atmosphere gas: wet gas of $N_2$ (the oxygen partial pressure: $10^{-6}$ MPa).

Note that a wetter was used to wet the atmosphere gas during the firing and annealing.

After polishing end faces of the obtained sintered body with sandblast, In—Ga alloy was coated as an external electrode to obtain a sample of the multilayer ceramic capacitor shown in FIG. 1. The size of the obtained capacitor sample was 3.2 mm×1.6 mm×0.6 mm, the thickness of the dielectric layer was 10 the thickness of the internal electrode layer was 1.0 and the number of the dielectric layers sandwiched by the internal electrode layers was 5.

The obtained capacitor samples were subjected to the measurements of the area ratio of the diffusion phase, the concentration of the rare earth element R and Zr in the diffusion phase, the insulation resistance (IR) and the high temperature accelerated lifetime (MTTF) of the multilayer ceramic capacitor in accordance with the method shown in below.

Area Ratio of the Diffusion Phase

The area ratio of the diffusion phase in the dielectric particle was calculated by processing the microscopic image of the cross section of the dielectric layer by the image processing software or so. First, the capacitor sample was cut at the perpendicular face in the stacking direction; then this face being cut was subjected to a chemical etching. The cross section was observed under the magnification of 20000×, then the area of the dielectric particles were calculated for arbitrarily selected 200 dielectric particles. The circle equivalent diameter of the particle was calculated from this area, and the average dielectric particle diameter $L_{1ave}$ was obtained. Also, the ion-milling was carried out, and from the backscattered electron image of the electronic microscope, the average core particle diameter $L_{2ave}$ was obtained in a similar manner for the area which does not have the rare earth element R (core). Note that, in case the core part is not observed, the core particle diameter was considered zero (0). Further, from the obtained average dielectric particle diameter $L_{1ave}$ and average core particle diameter $L_{2ave}$, the area ratio (the average shell ratio) of the diffusion phase (shell) occupying the area of the dielectric layer was calculated from the below equation.

The average shell ratio (%)=100×(1−($L_{2ave}^2/L_{lave}^2$))

Concentration Measurement of the Rare Earth Element R and Zr in the Diffusion Phase The area analysis of Ti, the earth element R and Zr in the diffusion phase were carried out using the energy ray dispersive X ray spectrometer (EDS) attached to the transmission electron microscope (TEM). This area analysis was carried out to 150 or more of the dielectric particles. The area (visual field) having 30 or more of the dielectric particles was measured for 5 visual fields or more. Then, by analyzing the characteristic X ray obtained from the analysis, the mapping image showing the distribution of Ti, the rare earth element R and Zr was obtained. For each analysis point, the concentration of the rare earth element R and Zr when the concentration of the Ti atom is 100 atom % were calculated, then the average concentration Ra of the rare earth element R, and the average concentration Za of Zr were obtained, thereby the concentration ratio Ra/Za was calculated.

Insulation Resistance (IR)

Using an insulation resistance meter (R8340A by Advantest), the insulation resistance IR of the capacitor applying DC voltage of 500V at 25° C. for 10 seconds, then leaving for 50 second after the voltage application was measured. In the present example, $1.0\times10^{12}\Omega$ or more was defined good (A), $2.0\times10^{12}\Omega$ or more was defined excellent (S), and less than $1.0\times10^{12}\Omega$ was defined poor (F).

High Temperature Accelerated Lifetime (MTTF)

The DC voltage was kept applied to the capacitor sample under the electric field of 60V/μm at 200° C., then by measuring the insulation deterioration time of the capacitor sample, the high temperature accelerated lifetime was evaluated. In the present example, the lifetime is defined as the time which took for the insulation resistance to drop by one digit from the start of the voltage application. Also, the above mentioned evaluation was carried out to 10 capacitor samples, then the mean time to failure was calculated by carrying out the weibull analysis, then this mean time to failure was defined as the high temperature accelerated lifetime of the sample. In the present example, 20 hours or longer was defined good (A), 40 hours or longer was defined as excellent (S), and less than 20 hours was defined failure (F).

The results are shown in following Table. In the table, "*" mark represents the sample which is out of the range of the claim 1, and the value shown in italicized font shows the value which is out of the range of the claim 1. The content of the sub components refers to the content in terms of predetermined oxides. Also, in case plurality of components is used, it is shown alongside, and the content thereof is also shown. For example, (Si, Al) (2.9, 0.3) mean that 2.9 mol of Si oxides and 0.3 mol of Al oxides were used together.

Figure 3:
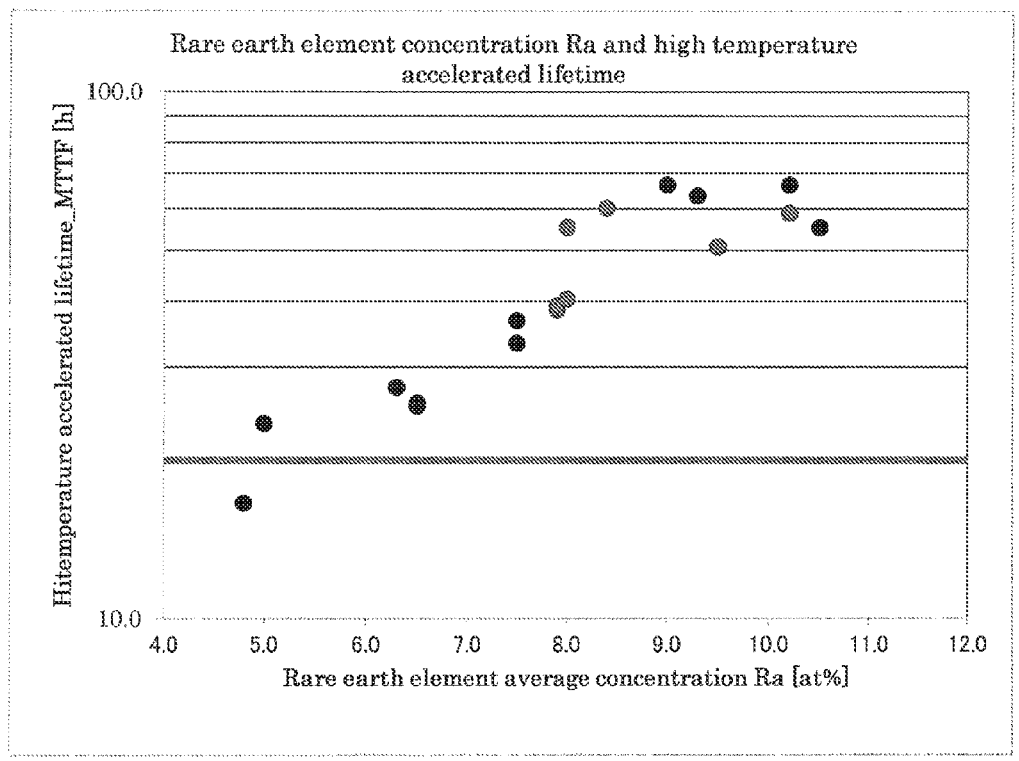
FIG. 3 shows the relation between the high temperature accelerated lifetime (MTTF) and the rare earth element average concentration Ra of the samples 9 to 26 in the examples.
Figure 4:
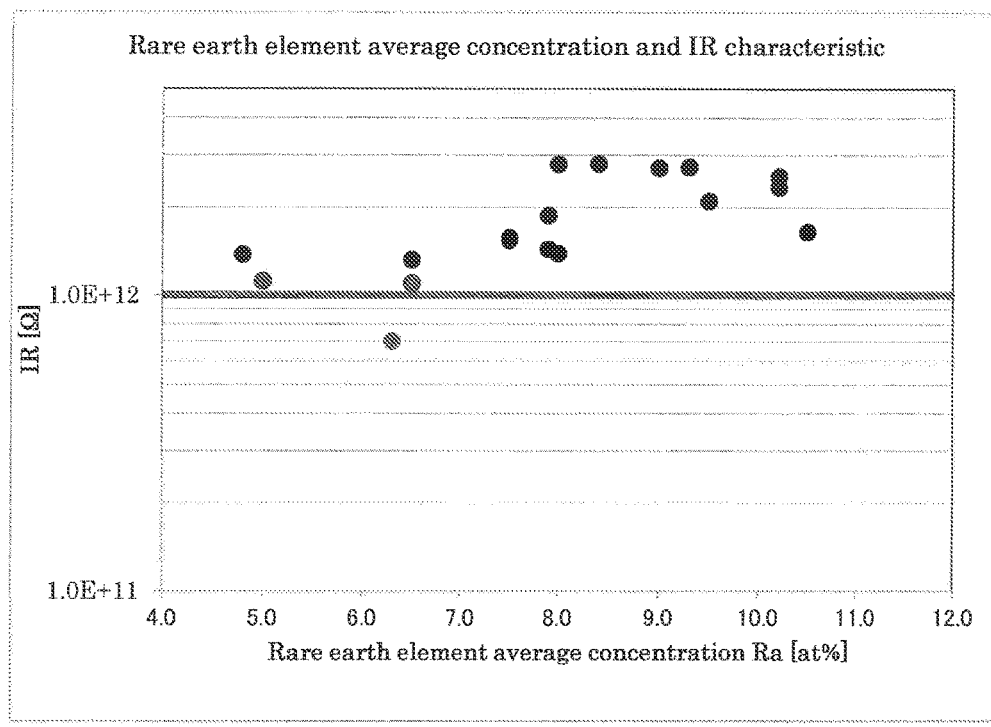
FIG. 4 shows the relation between the IR characteristic and the rare earth element average concentration Ra of the samples 9 to 26 in the examples.
Figure 5:
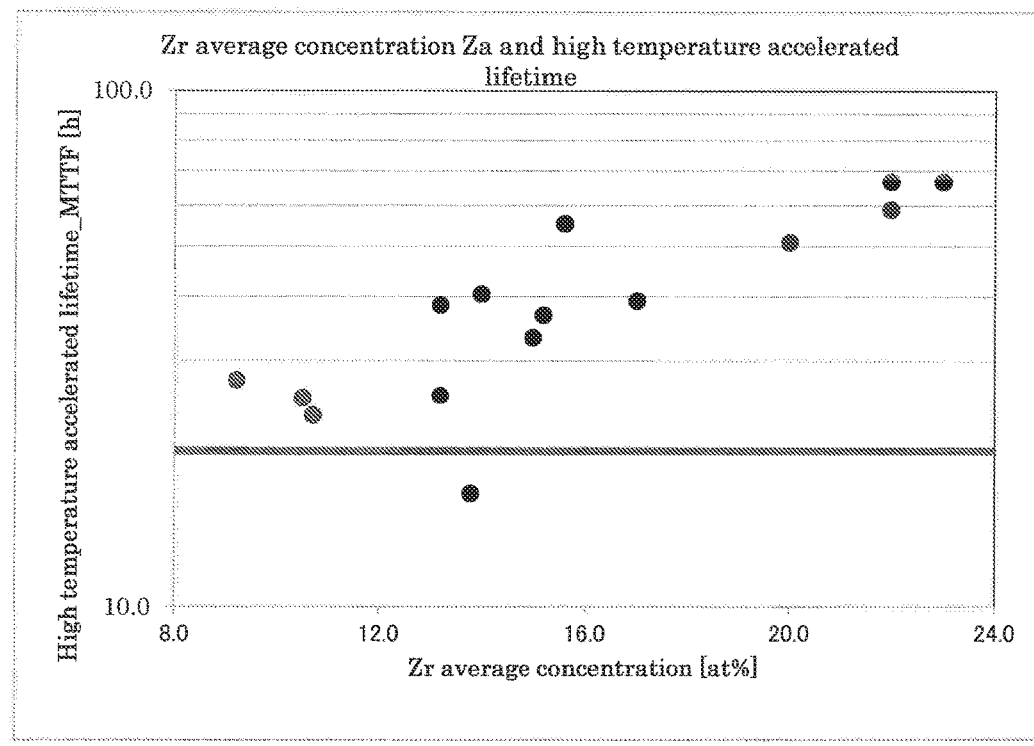
FIG. 5 shows the relation between the high temperature accelerated lifetime (MTTF) and Zr average concentration Za of the samples 9 to 26 in the examples.
Figure 6:
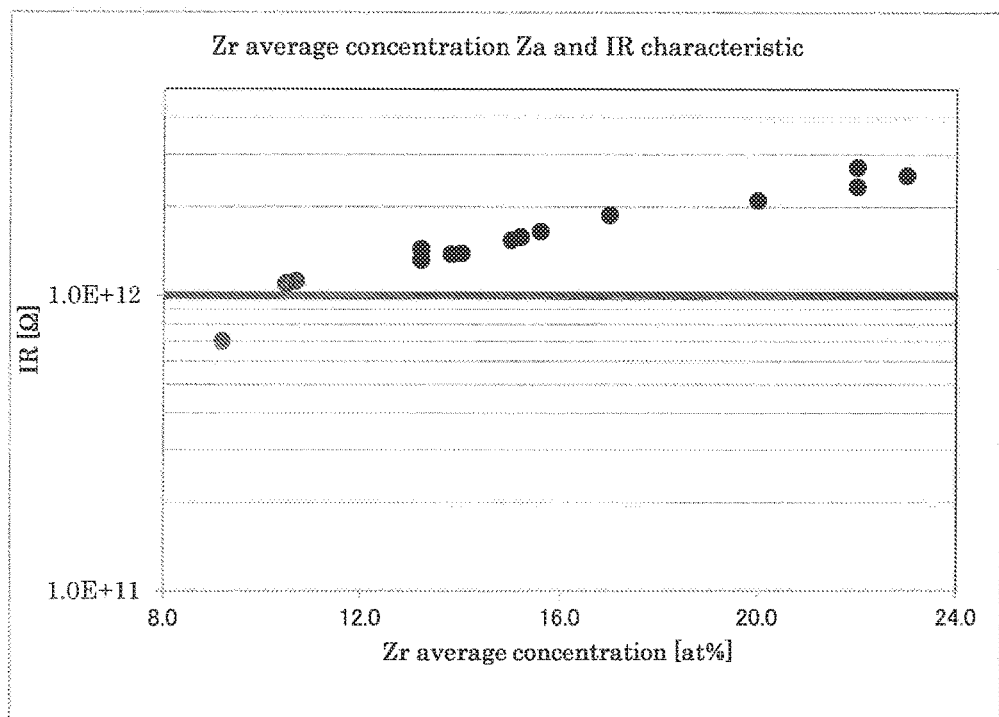
FIG. 6 shows the relation between the IR characteristic and Zr average concentration Za of the samples 9 to 26 in the examples.

For the samples 9 to 26, the relation between the high temperature accelerated lifetime (MTTF) and the rare earth element average concentration Ra is shown in FIG. 3, and the relation between IR characteristic and the rare earth element average concentration Ra is shown in FIG. 4. Also, the high temperature accelerated lifetime (MTTF) and the average concentration Za of Zr is shown in FIG. 5, and IR characteristic and the average concentration Za of Zr is shown in FIG. 6.

TABLE 1

| | Sample | $(Ba_{1-x-y}Sr_xCa_y)_m$ $(Ti_{1-z}Zr_z)O_3$ | | | | First sub component $RO_{3/2}$ [mol %] | | Sintering agent | | Third sub component MgO | | Fourth sub component MO | |
|---|---|---|---|---|---|---|---|---|---|---|---|---|---|
| | | m | x | y | z | Element | Total | Element | Content [mol %] | Element | [mol %] | Element | [mol %] |
| ✻ | 1 | *0.935* | 0 | 0.01 | 0.13 | Ho | 13 | 13 | Si | 3 | Mg | 6 | Mn | 1.2 |
| | 2 | 0.940 | 0.01 | 0 | 0.14 | Eu | 12 | 12 | Si | 3.7 | Mg | 5.5 | Mn | 1.35 |
| | 3 | 1.100 | 0.01 | 0 | 0.15 | Tb | 12 | 12 | Si, Al | 2.9, 0.3 | Mg | 5 | Mn | 1.4 |
| ✻ | 4 | *1.105* | 0 | 0.03 | 0.13 | Gd | 15 | 15 | Si | 3.5 | Mg | 6 | Mn | 1.2 |
| ✻ | 5 | 0.985 | 0 | 0.01 | *0.09* | Eu | 11 | 11 | Si | 2.8 | Mg | 4.5 | Mn | 1.1 |
| | 6 | 0.990 | 0 | 0 | 0.10 | Gd | 12 | 12 | Si | 3 | Mg | 4.9 | Mn | 0.9 |
| | 7 | 0.990 | 0.01 | 0.01 | 0.30 | Gd | 14 | 14 | Si | 3 | Mg | 5 | Cr | 1 |
| ✻ | 8 | 0.970 | 0 | 0.01 | *0.31* | Gd | 16 | 16 | Si | 4 | Mg | 6 | Cr | 1.5 |
| | 9 | 0.970 | 0 | 0.01 | 0.14 | Gd | 11 | 11 | Si | 3 | Mg | 5 | Mn | 1.4 |
| | 10 | 0.970 | 0 | 0.01 | 0.17 | Gd | 12 | 12 | Si | 2.6 | Mg | 5 | Mn | 1.1 |
| | 11 | 0.985 | 0.01 | 0.01 | 0.16 | Gd, Y | 7, 3 | 10 | Si | 3 | Mg | 4.5 | Mn | 1.1 |
| | 12 | 0.980 | 0 | 0 | 0.16 | Gd, Ho | 5, 3 | 8 | Si | 2.6 | Mg | 8 | Mn | 1.2 |
| ✻ | 13 | 0.960 | 0.01 | 0 | 0.15 | Gd | 7 | 7 | Si | 2.8 | Mg | 8 | Cr | 1.35 |
| | 14 | 0.970 | 0 | 0.01 | 0.20 | Gd | 12 | 12 | Si | 3.6 | Mg | 5 | Mn | 1.1 |
| | 15 | 0.970 | 0 | 0 | 0.22 | Gd | 11 | 11 | Si | 3.3 | Mg | 5 | Mn | 1.4 |
| | 16 | 0.985 | 0.02 | 0 | 0.11 | Gd, Y | 5, 6 | 11 | Si | 3.3 | Mg | 4.5 | Mn | 1.1 |
| ✻ | 17 | 0.970 | 0 | 0.02 | 0.12 | Gd | 10 | 10 | Si | 2.6 | Mg | 5 | Cr | 1.4 |
| | 18 | 0.990 | 0 | 0.01 | 0.15 | Gd | 10 | 10 | Si | 3 | Mg | 5 | Mn | 1.4 |
| | 19 | 0.990 | 0 | 0 | 0.18 | Gd | 13 | 13 | Si, Al | 1.5, 1.5 | Mg | 5 | Mn | 1.4 |
| | 20 | 0.970 | 0.02 | 0 | 0.23 | Gd | 12 | 12 | Si | 2.6 | Mg | 5 | Mn | 1.4 |
| | 21 | 0.980 | 0.01 | 0.01 | 0.25 | Gd | 13 | 13 | Si | 3 | Mg | 5 | Mn | 1.4 |
| | 22 | 0.980 | 0 | 0.01 | 0.25 | Gd | 12 | 12 | Si | 3 | Mg | 5 | Mn | 1.4 |
| | 23 | 0.980 | 0 | 0 | 0.26 | Gd | 11 | 11 | Si | 3.3 | Mg | 5 | Mn | 1.4 |
| | 24 | 0.970 | 0.02 | 0 | 0.27 | Gd | 11 | 11 | Si | 3.3 | Mg | 5 | Mn | 1.4 |
| | 25 | 0.970 | 0.01 | 0.01 | 0.29 | Gd | 11 | 11 | Si | 3 | Mg | 5 | Mn | 1.4 |
| | 26 | 0.970 | 0 | 0.02 | 0.30 | Gd | 10 | 10 | Si | 3 | Mg | 5 | Mn | 1.4 |
| | 27 | 0.970 | 0 | 0.01 | 0.18 | Tb | 12 | 12 | Si | 3 | Mg | 5 | Mn | 1.1 |
| | 28 | 0.970 | 0 | 0 | 0.17 | Tb | 12 | 12 | Si | 3.7 | Mg | 5 | Mn | 1.1 |
| | 29 | 0.970 | 0 | 0.01 | 0.18 | Gd | 12 | 12 | Si, Al | 2.0, 1.0 | Mg | 5 | Mn | 1.1 |

TABLE 1-continued

| | Sample | | | | | | | | | | | | |
|---|---|---|---|---|---|---|---|---|---|---|---|---|---|
| ※ | 30 | 0.980 | 0.02 | 0 | 0.16 | Ho | 11 | 11 | Si | 2.8 | Mg | 8 | Mn | 1.2 |
| | 31 | 0.970 | 0 | 0 | 0.22 | Gd | 11 | 11 | Si | 3.3 | Mg | 5 | Mn | 1.4 |
| | 32 | 0.970 | 0 | 0 | 0.22 | Gd | 11 | 11 | Si | 3.3 | Mg | 5 | Mn | 1.4 |
| ※ | 33 | 0.970 | 0 | 0 | 0.22 | Gd | 11 | 11 | Si | 3.3 | Mg | 5 | Mn | 1.4 |
| ※ | 34 | 0.970 | 0 | 0 | 0.22 | Gd | 11 | 11 | Si | 3.3 | Mg | 5 | Mn | 1.4 |

| | Sample | Area ratio of diffusion phase % | Element concentration of diffusion phase [at %] | | | [R[Ω]] 500 V, 1 min | | High temperature accelerated lifetime (MTTF)[h] 200° C., 60 V/um | |
|---|---|---|---|---|---|---|---|---|---|
| | | | Average concentration of R — Ra | Average of Zr — Za | Ra/Za | | Evaluation | | Evaluation |
| ※ | 1 | 100.0 | 8.9 | 10.1 | 0.88 | 8.5E+09 | F | unable to measure | F |
| | 2 | 100.0 | 7.2 | 10.5 | 0.69 | 1.1E+12 | A | 38.9 | A |
| | 3 | 100.0 | 5.1 | 13.5 | 0.38 | 1.9E+12 | A | 21.1 | A |
| ※ | 4 | 100.0 | 5.1 | 11.1 | 0.46 | 1.9E+12 | A | 15.8 | F |
| ※ | 5 | 100.0 | 7.9 | 8.2 | 0.96 | 7.9E+11 | F | 45.3 | S |
| | 6 | 100.0 | 7.4 | 10.0 | 0.74 | 1.1E+12 | A | 39.8 | A |
| | 7 | 100.0 | 7.0 | 15.0 | 0.47 | 1.9E+12 | A | 22.2 | A |
| ※ | 8 | 100.0 | 7.0 | 19.2 | 0.36 | 2.3E+12 | S | 17.6 | F |
| | 9 | 100.0 | 7.9 | 13.2 | 0.60 | 1.4E+12 | A | 38.5 | A |
| | 10 | 100.0 | 7.5 | 15.0 | 0.50 | 1.5E+12 | A | 33.3 | A |
| | 11 | 100.0 | 6.5 | 13.2 | 0.49 | 1.3E+12 | A | 25.7 | A |
| | 12 | 100.0 | 5.0 | 10.7 | 0.47 | 1.1E+12 | A | 23.5 | A |
| ※ | 13 | 100.0 | 4.8 | 13.8 | 0.35 | 1.4E+12 | A | 16.6 | F |
| | 14 | 100.0 | 7.9 | 17.0 | 0.46 | 1.9E+12 | A | 39.2 | A |
| | 15 | 100.0 | 7.5 | 15.2 | 0.49 | 1.6E+12 | A | 36.8 | A |
| | 16 | 100.0 | 6.5 | 10.5 | 0.62 | 1.1E+12 | A | 25.4 | A |
| ※ | 17 | 100.0 | 6.3 | 9.2 | 0.68 | 7.0E+11 | F | 27.5 | A |
| | 18 | 100.0 | 8.0 | 14.0 | 0.57 | 1.4E+12 | A | 40.4 | S |
| | 19 | 100.0 | 10.5 | 15.6 | 0.67 | 1.7E+12 | A | 55.3 | S |
| | 20 | 100.0 | 9.5 | 20.0 | 0.48 | 2.1E+12 | S | 50.9 | S |
| | 21 | 100.0 | 10.2 | 22.0 | 0.46 | 2.3E+12 | S | 58.9 | S |
| | 22 | 100.0 | 10.2 | 23.0 | 0.44 | 2.6E+12 | S | 66.6 | S |
| | 23 | 100.0 | 9.0 | 22.0 | 0.41 | 2.7E+12 | S | 66.6 | S |
| | 24 | 100.0 | 9.3 | 25.0 | 0.37 | 2.7E+12 | S | 63.5 | S |
| | 25 | 100.0 | 8.4 | 27.0 | 0.31 | 2.8E+12 | S | 60.2 | S |
| | 26 | 100.0 | 8.0 | 30.0 | 0.27 | 2.8E+12 | S | 55.3 | S |
| | 27 | 98.2 | 7.8 | 14.5 | 0.54 | 1.5E+12 | A | 28.8 | A |
| | 28 | 97.0 | 7.9 | 14.5 | 0.54 | 1.6E+12 | A | 22.2 | A |
| | 29 | 95.0 | 7.7 | 14.5 | 0.53 | 1.5E+12 | A | 20.1 | A |
| ※ | 30 | 94.8 | 7.8 | 13.7 | 0.57 | 1.1E+12 | A | 10.2 | F |
| | 31 | 100.0 | 10.1 | 21.5 | 0.47 | 2.4E+12 | S | 57.7 | S |
| | 32 | 100.0 | 8.8 | 18.3 | 0.48 | 2.2E+12 | S | 50.2 | S |
| ※ | 33 | 100.0 | 4.9 | 9.4 | 0.52 | 8.8E+11 | F | 18.5 | F |
| ※ | 34 | 100.0 | 4.4 | 7.5 | 0.59 | 7.3E+11 | F | 13.5 | F |

According to the samples 1 to 4, when the value "m" of the main component is small, the IR characteristic is lowered due to the over sintering (abnormal particle growth), on the other hand, if the value "m" is large, the sub components does not solid dissolve hence the high temperature accelerated lifetime is low.

According to the samples 5 to 8, by substituting Ti site with Zr (BaTiO$_3$→BaTi$_{1-z}$Zr$_z$O$_3$), the bandgap becomes high, thereby the resistance can be increased. On the other hand, if Zr is too much, the solid dissolving of the rare earth element to the main component is interfered, hence the high temperature accelerated lifetime declines.

According to the samples 9 to 26 and FIG. 3 to FIG. 6, it can be understood that by increasing the rare earth element concentration in the diffusion phase, the high temperature accelerated lifetime improves, and by increasing Zr concentration, IR characteristic tends to improve. A weak correlation can be confirmed for the relation between the rare earth element concentration and IR characteristic, and the Zr concentration and the high temperature accelerated lifetime; however if the rare earth element concentration is high but the Zr concentration is low, then IR characteristic is insufficient; and if the Zr concentration is high but the rare earth element concentration is low, then the high temperature accelerated lifetime is insufficient. According to this result, by making both the rare earth element concentration and Zr concentration high, a high IR characteristic and excellent high temperature accelerated lifetime can be both attained.

Further, according to samples 22 to 25, by setting the ratio Ra/Za between the rare earth element concentration Ra and the concentration Za of Zr within the specific range, higher IR characteristic and further excellent temperature accelerated lifetime can be both attained.

According to the samples 27 to 30, it can be understood, that if the area ratio of the diffusion phase is small, the high temperature accelerated lifetime decreases, and by using the dielectric particle having high solid dissolving rate to the diffusion phase of the rare earth element, preferably by using the complete solid solution particle, an excellent result can be obtained.

According to the samples 15, 31 to 34, by making the temperature increasing rate slow until right before the holding temperature of the calcination, the rare earth element concentration and Zr concentration in the diffusion phase are increased, and IR characteristic and the high temperature accelerated lifetime can be further improved.

NUMERICAL REFERENCES

1 . . . Multilayer ceramic capacitor
2 . . . Dielectric layer
21 . . . Core-shell structure particle
22 . . . Complete solid solution particle
3 . . . Internal electrode layer
4 . . . External electrode layer
10 . . . Capacitor element body

The invention claimed is:

1. A dielectric ceramic composition comprising,
a main component comprising a perovskite type compound shown by a compositional formula $(Ba_{1-x-y}Sr_xCa_y)_m(Ti_{1-z}Zr_z)O_3$ (note that, said "m", "x", "y" and "z" all show a mol ratio, and each satisfies $0.94 \le m \le 1.1$, $0 \le x \le 1.0$, $0 \le y \le 1.0$, $0 \le (x+y) \le 1.0$, $0.1 \le z \le 0.3$),
a first sub component comprising oxides of a rare earth element R (note that, R is at least one selected from the group consisting of Sc, Y, La, Ce, Pr, Nd, Pm, Sm, Eu, Gd, Tb, Dy, Ho, Er, Tm, Yb and Lu),
a second sub component as a sintering agent, wherein said dielectric ceramic composition includes plurality of dielectric particles,
said dielectric particles comprises a main component phase made of said main component, and a diffusion phase wherein said first sub component is diffused in said main component,
a ratio of area occupied by said diffusion phase is 95% or more in average with respect to a total area of said main component phase and said diffusion phase in a cross section, and
when a concentration of Ti atom in said diffusion phase is 100 atom %, then an average concentration of the rare earth element R in the diffusion phase is 5 atom % or more, and an average concentration of Zr in the diffusion phase is 10 atom % or more.

2. The dielectric ceramic composition as set forth in claim 1, wherein when the concentration of Ti atom in said diffusion phase is 100 atom %, the average concentration of the rare earth element R in the diffusion phase is 8 atom % or more.

3. The dielectric ceramic composition as set forth in claim 1, wherein when the concentration of Ti atom in said diffusion phase is 100 atom %, the average concentration of Zr in the diffusion phase is 20 atom % or more.

4. The dielectric ceramic composition as set forth in claim 2, wherein when the concentration of Ti atom in said diffusion phase is 100 atom %, the average concentration of Zr in the diffusion phase is 20 atom % or more.

5. The dielectric ceramic composition as set forth in claim 1, wherein when the average concentration of the rare earth element R in said diffusion phase is Ra, and the average concentration of Zr in the diffusion phase is Za, then Ra/Za satisfies $0.2<(Ra/Za)<0.45$.

6. The dielectric ceramic composition as set forth in claim 2, wherein when the average concentration of the rare earth element R in said diffusion phase is Ra, and the average concentration of Zr in the diffusion phase is Za, then Ra/Za satisfies $0.2<(Ra/Za)<0.45$.

7. The dielectric ceramic composition as set forth in claim 3, wherein when the average concentration of the rare earth element R in said diffusion phase is Ra, and the average concentration of Zr in the diffusion phase is Za, then Ra/Za satisfies $0.2<(Ra/Za)<0.45$.

8. The dielectric ceramic composition as set forth in claim 4, wherein when the average concentration of the rare earth element R in said diffusion phase is Ra, and the average concentration of Zr in the diffusion phase is Za, then Ra/Za satisfies $0.2<(Ra/Za)<0.45$.

9. An electronic component including the dielectric ceramic composition as set forth in claim 1.

10. A multilayer ceramic capacitor comprising a dielectric layer including the dielectric ceramic composition as set forth in claim 1, and an internal electrode layer.

* * * * *